Theodore G. Springer' Gas Machine

No. 119,663.  Patented Oct. 3, 1871.

Witnesses.
C. L. Evert
A. E. Yeatman

Inventor.
Theo. G. Springer
per
Alexander Mason
Attys.

UNITED STATES PATENT OFFICE.

THEODORE G. SPRINGER, OF FAYETTE CITY, PENNSYLVANIA.

IMPROVEMENT IN GAS-MACHINES.

Specification forming part of Letters Patent No. 119,663, dated October 3, 1871.

*To all whom it may concern:*

Be it known that I, THEODORE G. SPRINGER, of Fayette City, in the county of Fayette and State of Pennsylvania, have invented certain new and useful Improvements in Gas-Machines; and do hereby declare that the following is a full, clear, and exact description thereof, reference being had to the accompanying drawing and to the letters of reference marked thereon making a part of this specification.

The nature of my invention consists in the construction and arrangement of a gas-machine, as will be hereinafter more fully set forth.

In order to enable others skilled in the art to which my invention appertains to make and use the same, I will now proceed to describe its construction and operation, referring to the annexed drawing, in which—

Figure 1:
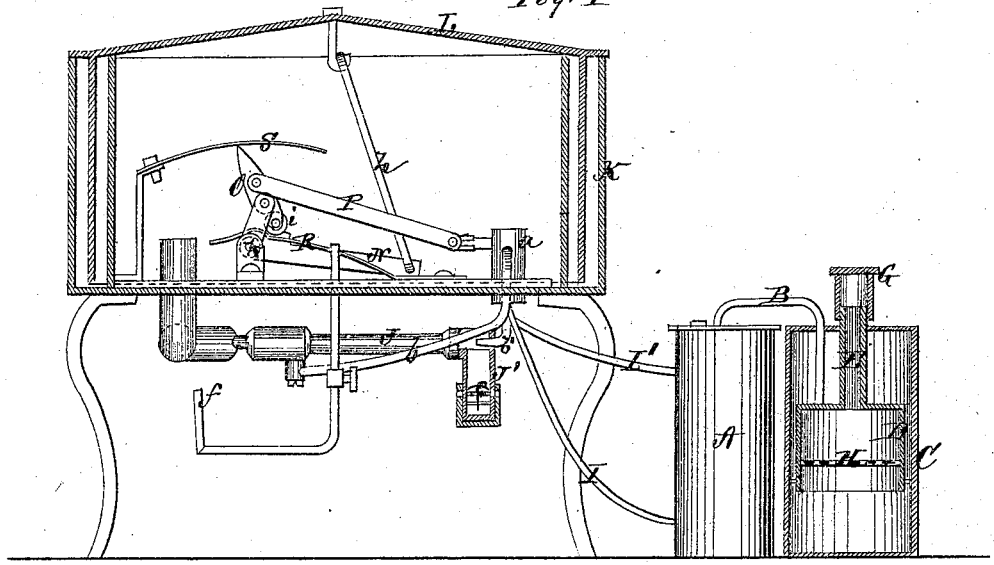
Figure 2:
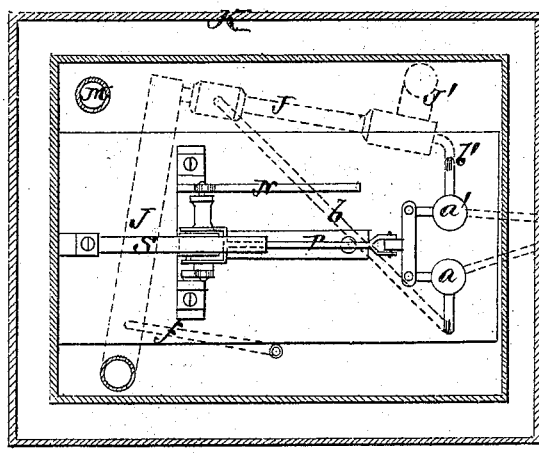
Figure 3:
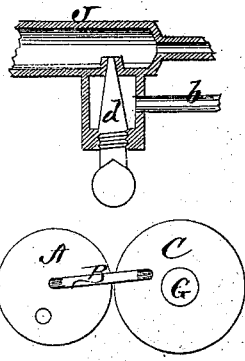
Figure 4:
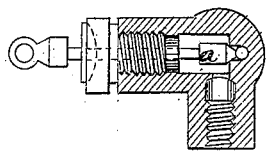

Figure 1 is a longitudinal vertical section of my machine. Fig. 2 is a plan view of the same. Fig. 3 is a section of the device where the gasoline is mixed with the combined hydrogen and atmospheric air. Fig. 4 is a section of one of the valves.

A represents the tank in which the gasoline is placed, connected by a tube, B, with the tank C, in which hydrogen gas is generated. Inside of the tank C is a bell-shaped cylinder, D, provided with a tube, E, extending from its top through the top of the tank C, and having at its upper end a cap, G. The lower end of the cylinder D is opened, and a short distance above its lower end is a perforated diaphragm, H, forming, as it were, a bottom for the cylinder. Through the tube E iron filings or other similar material is placed on the bottom H, and diluted sulphuric acid poured on the same to fill the tank C up to the top of the cylinder D, thereby producing hydrogen gas, which is used in the same manner as described in my patent for gas-machine dated November 3, 1870. The hydrogen gas passing through the tube B into the tank A produces a pressure upon the gasoline, forcing the gasoline through a tube, I, from near the bottom of the said tank up to a valve, a, while at the same time the hydrogen gas, which has become in a certain degree carbureted by the action of or by contact with the hydrocarbon in the tank A, passes through a tube, I', from near the top of the tank A, to another valve, a', both of said valves being situated within the gasometer K, and are open and closed instantaneously and simultaneously by means that will be presently described. From the valve a' the hydrogen gas passes through a pipe, b', into a large tube, J, the end of the pipe b' within said tube being contracted so that the gas will enter the large tube in the form of a thin jet. A branch, J', leads into the tube J directly opposite the point where the pipe b' enters, and in said branch is a valve, e, as shown in Fig. 1. Now, as the hydrogen gas passes from the small pipe b' into the large tube J it creates a vacuum, forming a suction strong enough to raise or lift the valve e to admit the atmospheric air to be mixed with the gas. The thus intermingled hydrogen, or perhaps more properly carbureted hydrogen and atmospheric air, passes through the tube J until it meets a jet of gasoline or other hydrocarbon liquid admitted into said tube from the valve a through a pipe, b. At the inlet of the gasoline into the tube J is a pointed screw, d, for the purpose of regulating the flow of the gasoline, as shown in Fig. 3. By this admixture the illuminating gas is completed and passes into the gasometer K after having been previously heated from a burner, f, placed underneath the tube at a point beyond where the gasoline has entered. The hydrogen gas may be heated before entering the valve a', if so desired. The gas, after entering the gasometer, is by the holder L supplied to the burners in the usual manner. From the inside of the gas-holder L a hook, h, connects with a lever, N, attached to a rocking shaft, k, in the bottom of the gasometer. Above said shaft, in ears projecting from the same, is another shaft, upon which is pivoted a lever, O, which above its pivot point is, by a rod, P, connected with both the valves a and a'. At the lower end of the lever O is a friction-roller, i, against which a pointed spring, R, bears. Another spring, S, bears against the upper end of the lever O. By this arrangement, when the gas-holder L rises the lever N is also raised, turning the lever O so that the roller i will pass the point on the spring R. It will be noticed that the valves remain stationary during the entire operation, until just as the roller passes the point they are instantaneously closed, thus shutting off the supply of both the hydrogen and the hydrocarbon. As soon, however, as the gas-holder sinks to a certain point the valves are in like manner instantaneously and simultaneously opened, admitting a new supply of gas.

Having thus fully described my invention, what I claim, and desire to secure by Letters Patent, is—

1. The process herein described for manufacturing illuminating gas, consisting of the mixing of carbureted hydrogen and atmospheric air and passing the same through a jet of hydrocarbon, substantially as herein set forth.

2. In a gas-machine where carbureted hydrogen and atmospheric air are mixed together, creating a suction for taking in the atmospheric air by means of compressed carbureted hydrogen, substantially as herein set forth.

3. Feeding hydrocarbon liquids to the point where they are mixed and formed into illuminating gas by the action of compressed hydrogen, substantially as herein set forth.

4. The combination of the tank C, cylinder D, tube E, and perforated bottom H with the air-chamber formed above the cylinder, all substantially as and for the purposes herein set forth.

5. The arrangement of the small tube $b'$, large tube J, and branch $J'$ with valve $e$, all substantially as and for the purposes herein set forth.

6. The device for operating the valves $a$ $a'$, consisting of the connecting-rod P, lever O, with roller $i$, springs R S, rock-shaft $k$, and lever N, the latter connected with the gas-holder, all constructed and arranged substantially as and for the purposes herein set forth.

In testimony that I claim the foregoing I have hereunto set my hand this 27th day of April, 1871.

THEODORE G. SPRINGER.

Witnesses:
C. L. EVERT,
EDW. F. BROWN.